UNITED STATES PATENT OFFICE.

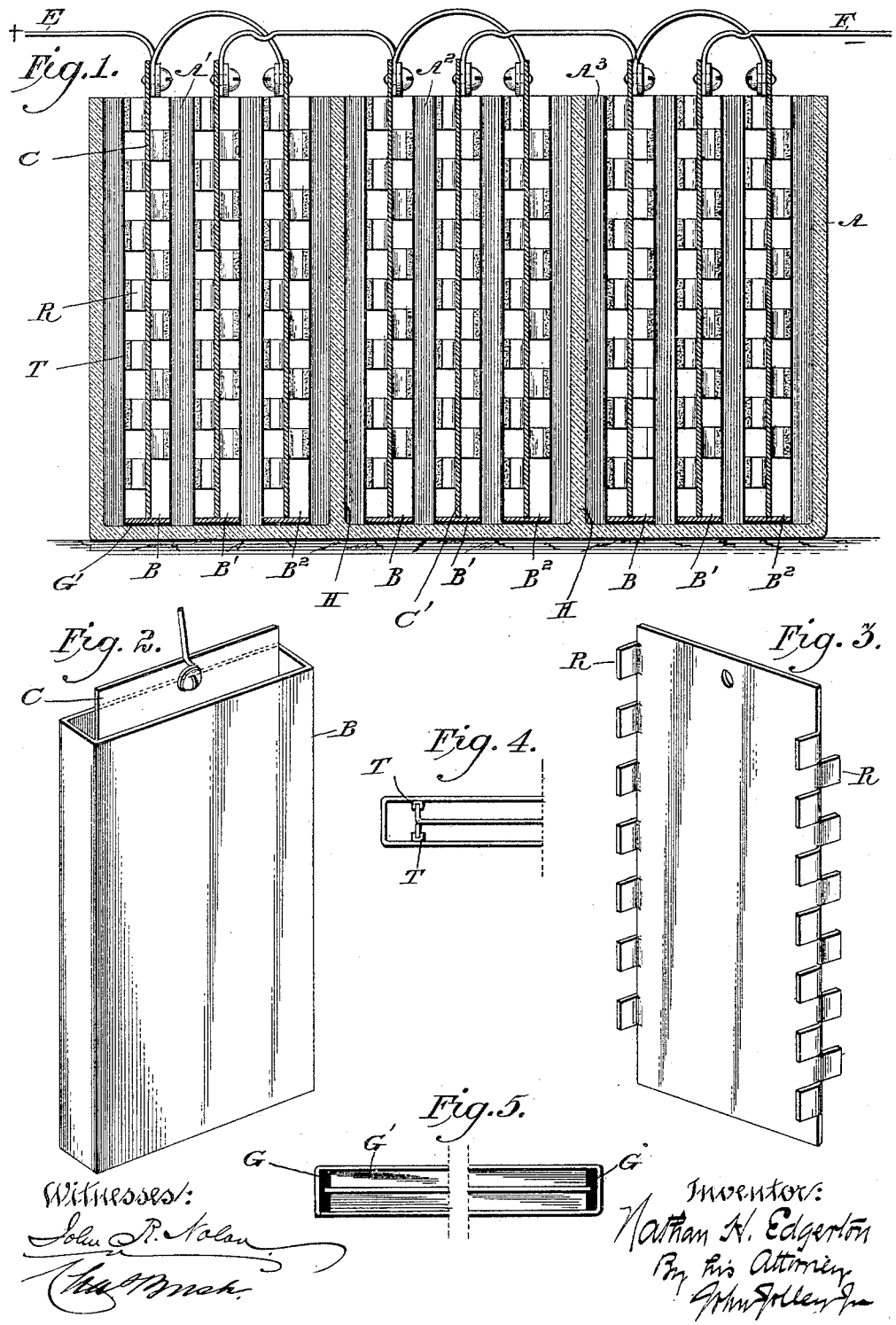

NATHAN H. EDGERTON, OF PHILADELPHIA, PENNSYLVANIA.

SECONDARY BATTERY.

SPECIFICATION forming part of Letters Patent No. 462,693, dated November 10, 1891.

Application filed January 14, 1891. Serial No. 377,698. (No model.)

*To all whom it may concern:*

Be it known that I, NATHAN H. EDGERTON, a citizen of the United States, residing in the city and county of Philadelphia, State of Pennsylvania, have invented certain new and useful Improvements in Storage - Batteries, of which the following is a specification, due reference being had to the accompanying drawings, which illustrate my invention.

My invention relates to electric accumulators commonly known as "secondary" or "storage" batteries, the object sought to be attained being the polarizing of the battery—that is to say, the construction and arrangement of the electrodes and their insulating-containing cells or pockets within the main cell of the battery—in such manner as to develop an increased voltage or tension of electrical energy; and to that end my invention consists in the construction and arrangement of the parts, as hereinafter more particularly described.

In the accompanying drawings, illustrating my invention, Figure 1 is a longitudinal vertical section of a secondary battery constructed according to my invention, the main cell of which is shown, preferably, divided into three compartments, showing in each a set of three contained in the cells or pockets, with an insulated electrode in each, and showing, also, the wire connections between these several sets of electrodes. Fig. 2 is a perspective view of one of the inner cells or pockets with the insulated electrode in place therein. Fig. 3 is a perspective view of the electrode. Fig. 4 is a plan of a corner of one of the inner cells, showing the adjacent portion of the electrode. Fig. 5 is a lateral section of the inner cell or pocket, showing a modified form of electrode and of the means for supporting the same insulated from the walls of its containing cells or pockets.

The main cell A is shown, preferably, divided laterally into compartments, as at A' A² A³, by intervening partitions, allowing sufficient space therein to readily contain three of the inner cells or pockets B B' B². The partitions H H are not, however, essential. I have discovered that the voltage is very materially increased by the arrangement of the electrodes in sets of three each, the outer two being of one pole and the inner of another. In these several sets of electrodes the electrical connection is made between the central electrode of one set with the two outer electrodes of the next set, and these with the central electrodes of the next set, and so on with the series, and the electrical connection by attached connecting-wires, as stated, to preserve the polarity is shown illustrated in Fig. 1. The main cell A or its compartments A' A² A³ is filled with an electrolyte, such as diluted sulphuric acid. The inner cells or pockets B B' B², arranged in groups of three, as stated, are placed within the main cell or jar A and surrounded by the liquid electrolyte. These inner cells or pockets are constructed, as shown at B, Fig. 2, of a metallic substance, and are wholly or nearly filled with the active chemical material, preferably litharge, or any oxide of lead, mixed with an electrolyte, such as diluted sulphuric acid, to form a mixture of pasty consistency. In this active material thus placed in the inner cell or pocket B is thrust an electrode-terminal C, such as a lead plate extending nearly but not completely to the bottom of the pocket, and it is insulated at the bottom, preferably by resting upon a porcelain plate, such as G'.

In order that the electrode C shall be insulated from contact with the sides of the inner cell or pocket B, I construct it, as shown in Fig. 3, by making lateral slits or cuts at intervals in its two sides and bending the parts over, as shown at R R, and then fastening upon these bent parts R a cap-piece T (see Fig. 4) of some insulating material. The electrode will then be supported firmly in the inner cell or pocket and without electrical contact therewith. Another form of insulation, however, is shown in Fig. 5, in which the electrode is a flat piece of lead without the bent pieces R R, the place of which and their covers T are supplied by sliding the lead electrode C, Fig. 5, downward in the grooves of a vertical porcelain bar G, which thus not only insulates them from contact with the surface of the cell or pocket B, but holds them firmly in position therein.

The action of the parts is such that the current comes to the positive pole, as at E, and leaves by the negative pole, as at F, in its passage first reaching the electrode C, which has positive polarity, delivered from thence to the negative electrodes in that set, and thence to the central electrode C' of the second set as a current of positive polarity, and so on from set to set in like order to the delivery-wire F, and in its passage changing the contained oxide in the cells to peroxide, and from the latter in turn to monoxide.

I claim—

1. In an electric accumulator, a main containing cell or jar filled with an electrolytic liquid, in combination with a battery of electrodes arranged in sets of three each, each electrode contained within and insulated from a metallic cell filled with active material and contained within said main cell or jar, the central electrode in each set being of different polarity from the other two in each set, and electrical connections between the electrodes of different polarity in the several sets, substantially as described, and for the purposes set forth.

2. In an electric accumulator, the combination, with a metallic cup containing an active material, of an insulated electrode supported within the same, as described.

3. In an electric accumulator, the combination, with a main cell or jar and an electrolytic liquid contained therein, of an inner metallic cell containing active material and an insulated electrode supported within the same, substantially as described.

4. In a storage-cell, an electrode C, a metallic cell B, in which the same is contained, and grooved bars G, of non-conducting material, applied to the opposite narrow sides of said cell B, substantially as described.

In testimony whereof I have hereunto signed my name this 12th day of January, A. D. 1891.

NATHAN H. EDGERTON.

In presence of—
W. ALEX. ROBINSON,
JOHN JOLLEY, Jr.